L. ANDERSON.
BUNDLE TRANSFER FOR GRAIN BINDERS.
APPLICATION FILED MAR. 27, 1911.
1,073,066.
Patented Sept. 9, 1913.
3 SHEETS—SHEET 1.
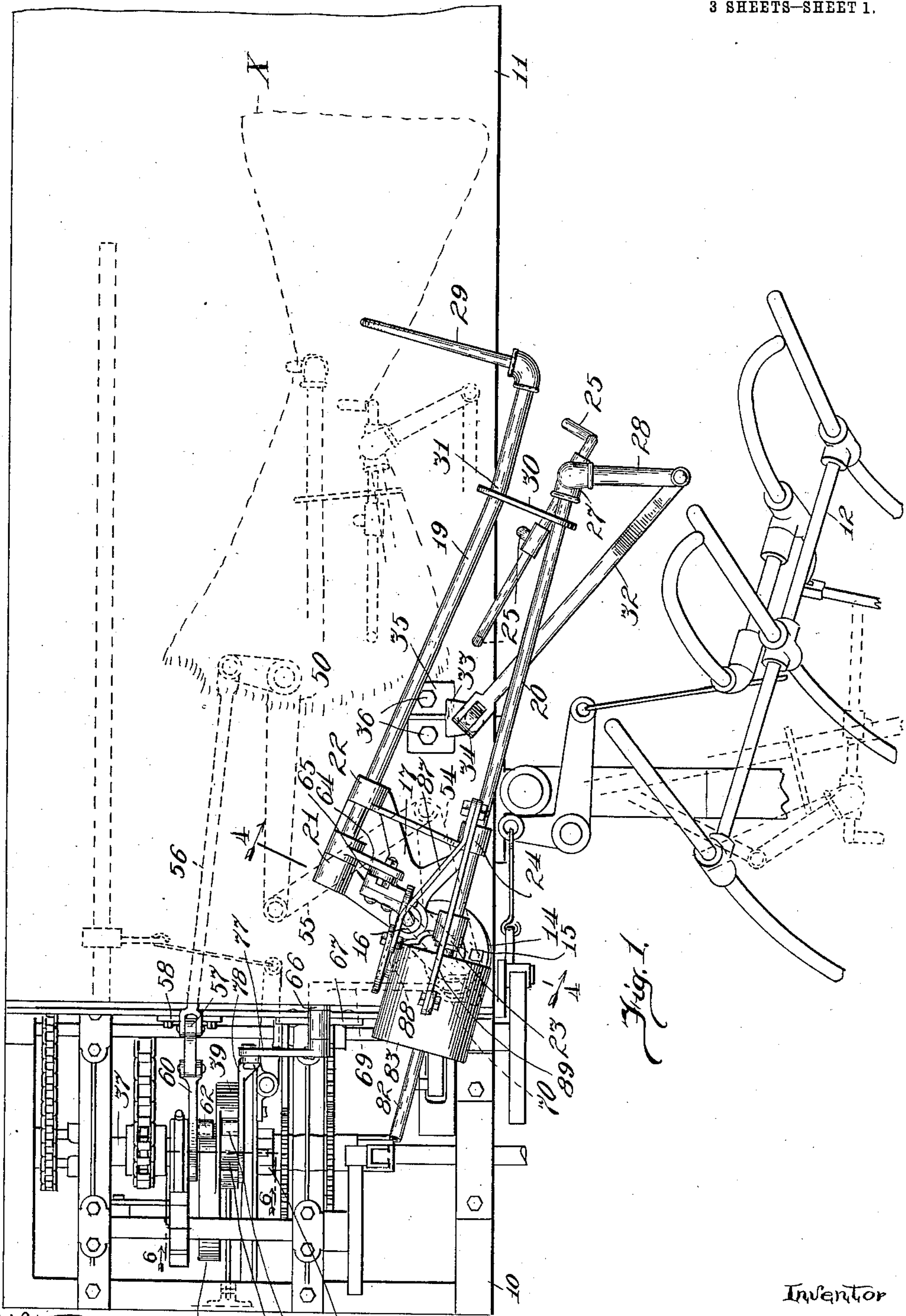
COLUMBIA PLANOGRAPH CO., WASHINGTON, D. C.

L. ANDERSON.
BUNDLE TRANSFER FOR GRAIN BINDERS.
APPLICATION FILED MAR. 27, 1911.
1,073,066. Patented Sept. 9, 1913.
3 SHEETS—SHEET 2.
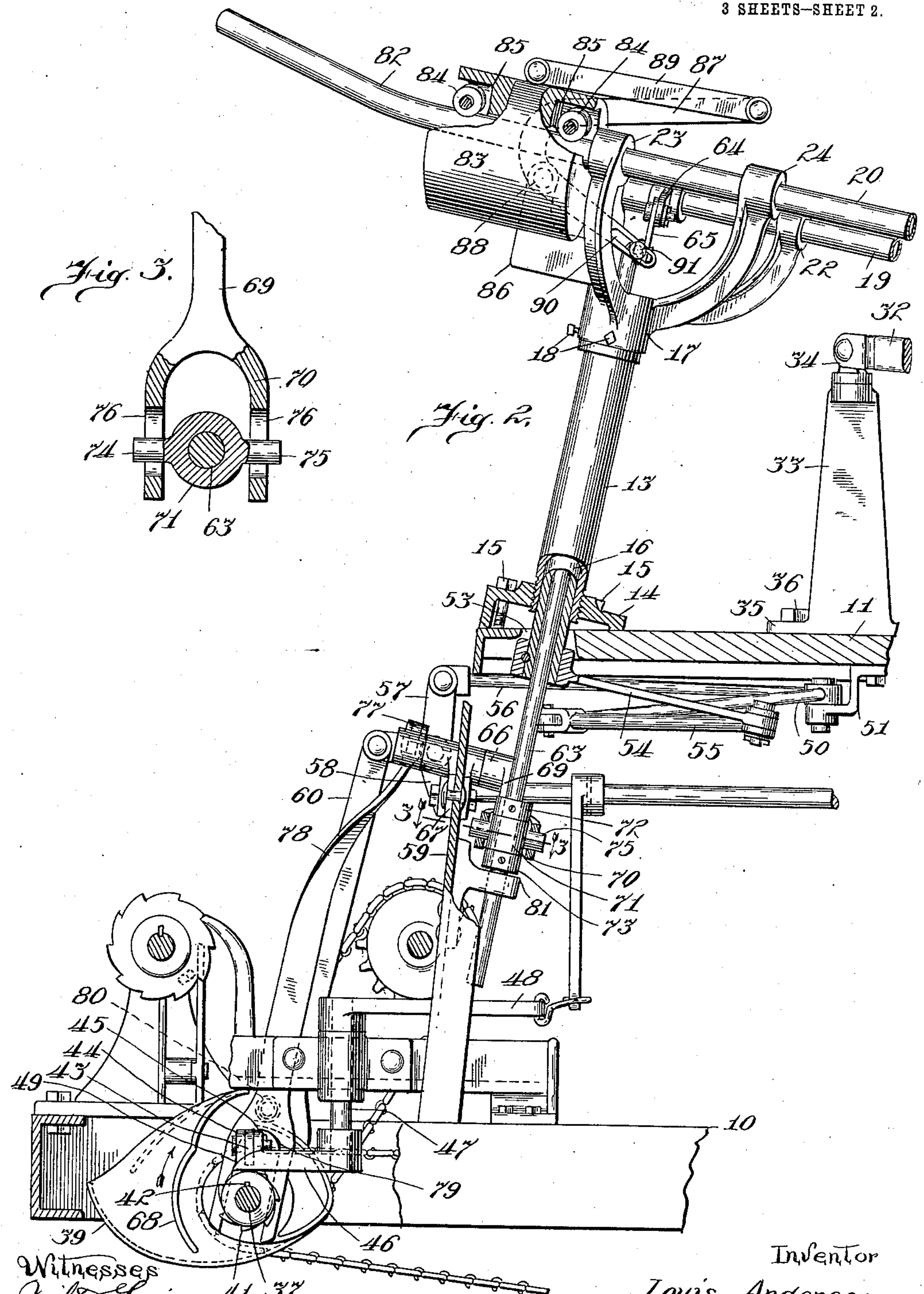
Witnesses
Milton Lenoir
E. M. Klatcher
Inventor
Louis Anderson,
By Gilson & Gilson
Attorneys.
COLUMBIA PLANOGRAPH CO., WASHINGTON, D. C.

L. ANDERSON.
BUNDLE TRANSFER FOR GRAIN BINDERS.
APPLICATION FILED MAR. 27, 1911.
1,073,066. Patented Sept. 9, 1913.
3 SHEETS—SHEET 3.
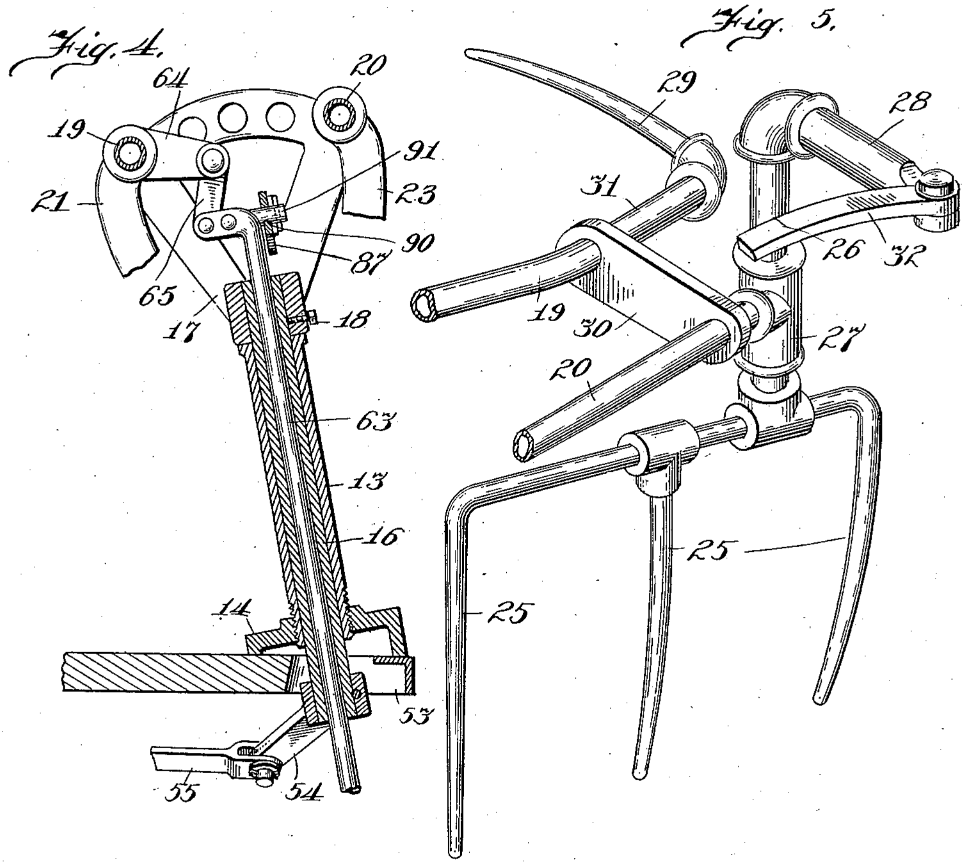
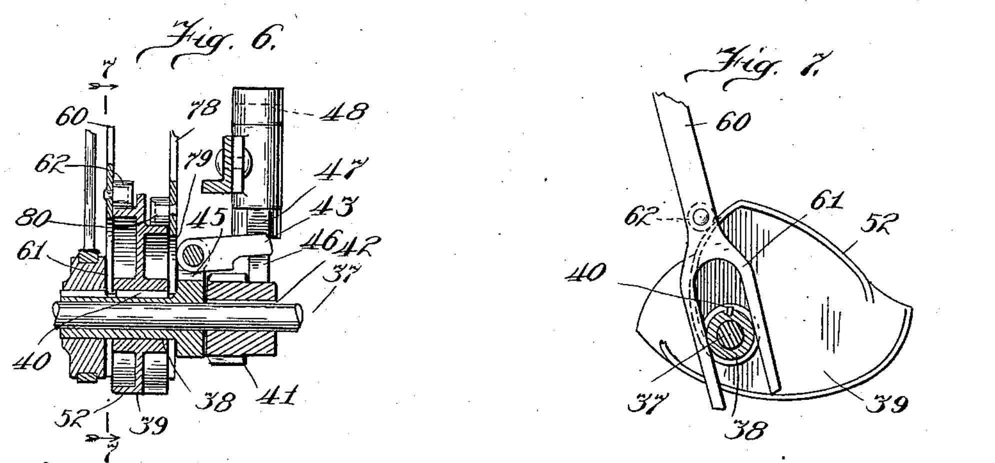
Witnesses
Milton Lenoir
E. M. Klatcher
Inventor
Louis Anderson
By [signature]
Inventor.
COLUMBIA PLANOGRAPH CO., WASHINGTON, D. C.

UNITED STATES PATENT OFFICE.

LOUIS ANDERSON, OF CHICAGO, ILLINOIS.

BUNDLE-TRANSFER FOR GRAIN-BINDERS.

1,073,066. Specification of Letters Patent. Patented Sept. 9, 1913.

Application filed March 27, 1911. Serial No. 617,303.

*To all whom it may concern:*

Be it known that I, LOUIS ANDERSON, a citizen of the United States, and resident of Chicago, county of Cook, and State of Illinois, have invented certain new and useful Improvements in Bundle-Transfers for Grain-Binders, of which the following is a specification, and which are illustrated in the accompanying drawings, forming a part thereof.

The invention relates to mechanism for transferring bundles of grain as from one position to another upon a harvesting machine.

The invention is particularly adapted for use upon harvesting machines, such for example as that shown in my application for patent on shock formers for grain binders, filed October 1, 1908, Serial No. 455,654, wherein a backwardly tilting cradle is provided for collecting a number of bundles of grain and then depositing them upon the ground in the form of a shock. It is well known that grain binders receive the freshly cut grain with the butt ends of the stalks turned in the direction of travel of the machine; whereas, if the bundles are to be deposited upon the ground in the form of a shock by means of a backwardly tilting cradle, they must be turned end for end in order that the grain may stand unpright in the shock.

The invention contemplates improved means for transferring the bundles of grain from the table of a harvesting machine, upon which the bundles are tied, to a shock-forming or other cradle adapted to deposit the bundles upon the ground, the bundles being turned end for end in transit.

The object of the invention is to simplify and improve the construction of bundle transfer of the kind described, whereby they are rendered more certain in their operation.

In the accompanying drawings, Figure 1 is a plan view of a bundle transfer embodying the features of improvements provided by the invention, details of a harvesting machine being also shown; Fig. 2 is a side elevation of the same, some of the parts being shown in section; Fig. 3 is a sectional view taken on the line 3—3 of Fig. 2; Fig. 4 is a detail sectional view taken on the line 4—4 of Fig. 1; Fig. 5 is a detail perspective view; Fig. 6 is a sectional view taken on the line 6—6 of Fig. 1; and Fig. 7 is a sectional view taken on the line 7—7 of Fig. 6.

Details of a frame of a harvesting machine are shown in the drawings at 10. The platform upon which the bundles of grain are tied is shown at 11, and details of a shock-forming cradle appear in Fig. 1 of the drawings at 12.

The apparatus provided by the invention is intended to transfer the bundles of grain as X, one at a time, from the platform 11 to the cradle 12 and turn them end for end in transit. As shown, a forwardly inclined tubular post 13 rises from the platform 11 adjacent its rear end. The base 14 of the post 13 is rigidly secured to the platform 11, as by lag screws 15, and serves to support the post in fixed position. A tubular shaft 16 extends vertically through the post 13 and carries a forked bracket or head, generally designated 17, at its higher end. The head 17 is seated upon the top of the post 13 and is rotated thereon by the turning of the tubular shaft 16 to which it is fixed in an angularly adjusted position as by set screws 18. A pair of bundle-grasping arms 19, 20, project laterally from the head 17. As shown, the head 17 is provided with two pairs of arms as 21, 22, and 23, 24. Each pair of these arms provides a double support for one of the bundle-grasping arms 19, 20, the arm 19 being rotatably mounted in the arms 21, 22, and the bundle-grasping arm 20 being preferably fixed against rotation in the arms 23, 24. One of the bundle-grasping arms, as the non-rotatable arm 20, carries at its outer end a depending fork 25. The fork 25 is preferably rotatably mounted at the end of the arm 20, as by being secured to the lower end of the vertical shaft 26 which turns in a vertically disposed bearing 27 formed upon the end of the arm 20. A crank 28 is applied to the higher end of the vertical shaft 26 for turning the fork 25. The bundle-grasping arm 19 has a laterally projecting prong 29 formed upon its outer end and this prong coöperates with the fork 25 to grasp a bundle of grain as X upon the turning of the arm 19. For increasing the rigidity of the parts the arms 19, 20, are preferably connected adjacent their outer ends as by a tie-plate 30, with which the arm 19 has rotative engagement, and the arm 19 is offset beyond the tie-plate as indicated at 31, whereby the prong 29 is lowered by the turning of the arm.

In the operation of the device the bundle-grasping arms 19, 20, are swung between positions in which their outer ends are located over the platform 11 and over the cradle 12, respectively, by the turning of the tubular shaft 16. Preferably during the formation of the bundle as X upon the platform 11 the arms 19, 20, occupy the intermediate position illustrated by full lines in Fig. 1 of the drawings. When a bundle as X has been completed upon the platform 11 the arms 19, 20, are first swung upwardly, as viewed in Fig. 1, to a position over the platform 11; the arm 19 is then rotated to grasp the bundle between the prong 29 and fork 25. The tubular shaft 16 is then rotated to swing the arms 19, 20, outwardly, as viewed in Fig. 1, until the bundle X reaches a position over the cradle 12, when the arm 19 is given a partial counter rotation to raise the prong 29 and release the bundle. The fork 25 is rotated during the swinging of the arms 19, 20, to turn the bundle end for end by moving it about the prong 29. For turning the fork 25 the crank arm 28 is preferably connected by a link 32, to a fixed support, such as the standard 33 located in front of the post 13. As shown, the standard 33 rises from the platform 11 and the link 32 is connected to the top of the standard 33 by a swivel 34. The standard 33 is most conveniently provided with an integral base 35 through which screw bolts 36 are passed for permanently securing the standard to platform 11, and the standard is of such height that the link 32 is located below the plane through which the arms 19, 20, swing.

Power for turning the tubular shaft 16 and rotating the arm 19 is most conveniently derived from a continuously rotating shaft 37 of the harvesting machine. As shown, a sleeve 38, is loosely mounted on the shaft 37, and a two-faced cam 39 is fixed upon the sleeve 38, as by a key 40, to be rotated by the turning of the sleeve.

For intermittently connecting the sleeve 38 with the rotating shaft 37 to cause said sleeve 38 and cam 39 to be turned through a single complete revolution, clutch mechanism, most clearly shown in Figs. 2 and 6 of the drawings, is employed. A ratchet 41 is fixed upon the shaft 37 adjacent the end of the sleeve 38, as by a key 42, and a clutch arm 43 is pivotally mounted between a pair of laterally projecting lugs 44, 45, formed upon the sleeve 38 adjacent its end to extend over the ratchet 41. A cam finger 46 normally supports the clutch arm 43 clear of the ratchet 41, but is withdrawn from engagement with the clutch arm 43 when the bundle transfer mechanism is to be operated. As shown, the cam finger 46 is carried by a vertically arranged rock shaft 47 and a crank arm 48 is secured to the higher end of the rock shaft 47 for turning the rock shaft and withdrawing the cam finger 46 from engagement with the clutch arm 43. The end 49 of the cam finger 46 is inclined and when the sleeve 38 has been turned through a complete revolution by the engagement of the ratchet 41 with the clutch arm 43, the end of the clutch arm 43 rides upon the cam finger 46 and is raised thereby out of engagement with the ratchet 41 to permit the sleeve 38 to come to rest.

Operative mechanism including a bell-crank lever 50 pivotally mounted upon a bracket 51 secured to the underside of platform 11, is actuated by one of the faces as 52 of the cam 39, to turn the tubular shaft 16 and swing the bundle-grasping arms 19, 20. As shown, the lower end of the tubular shaft 16 extends through an opening 53 in the platform 11 and has applied thereto below the platform a crank arm 54 which is connected by a link 55 to one of the arms of the bell-crank lever 50. The other arm of the bell-crank lever 50 is connected by a link 56 to one arm of a second bell-crank lever 57 which is pivotally mounted to swing in a vertical plane upon a bracket 58 secured to an upright member as 59 of the frame 10 of the harvesting machine. The other arm of the bell-crank lever 57 has secured to it a pitman 60 which extends downwardly therefrom and has a bifurcated lower end 61 which straddles the sleeve 38 and shaft 37 and is in sliding engagement with the sleeve. A cam roller 62 mounted upon the side of the pitman 60 adjacent its lower end coöperates with the cam face 52 of the cam plate 39 to longitudinally reciprocate the pitman 60 and turn the tubular shaft 16.

A vertically reciprocable rod 63 extends through the tubular shaft 16 for rotating the bundle-grasping arm 19. As shown, a crank arm 64 is mounted on the arm 19 between the parts 21 and 22 of the head 17. This crank arm is connected to the higher end of the rod 63 by a link 65. Mechanism including a rock shaft 66, which is journaled in the bracket 67, mounted upon the upright member 59 of the frame 10 of the harvesting machine below the platform 11, is actuated by the other face 68 of the cam plate 39 to vertically reciprocate the rod 63. A crank arm 69 mounted upon one end of the rock shaft 66, is bifurcated at its end, as most clearly shown at 70 Fig. 3. The two parts of the bifurcated end 70 of this crank arm straddle a sleeve 71, which is rotatably mounted on the rod 63, but fixed against longitudinal movement thereon between collars 72 and 73. Oppositely formed lugs 74, 75, formed on the sleeve 71, run in longitudinally slotted apertures as 76 formed in the two parts of the bifurcated end 70 of the crank arm. A second crank arm 77 mounted on the rock shaft 66 is connected to the higher end of a pitman 78. The lower end 79 of the pitman 78 is bifurcated and straddles the sleeve 38 adjacent the cam plate 39. A cam roller 80 mounted upon a side face of the pitman 78 adjacent its lower end coöperates with the cam face 68 of the cam plate 39 to vertically reciprocate the pitman 78 and turn the rock shaft 66 to vertically reciprocate the rod 63. Preferably the lower end of the rod 63 is stayed by being extended through a bearing block 81 located below the sleeve 71 and collars 72, 73. The lower end of the rod 63 has both rotative and longitudinal sliding engagment with the bearing block 81, and the bearing block 81 is fixed in position in any convenient manner as by being secured to the upright member 59 of the frame 10 of the harvesting machine.

Preferably a counter-poise is provided for supporting a bundle X of grain, which is hung between the outer ends of the bundle-grasping arms 19, 20. This is conveniently provided by extending the arm 20 beyond the head 17 of the tubular shaft 16 from the fork 25 as indicated at 82, Figs. 1 and 2, and by slidingly mounting a weight 83 upon the part 82. Preferably the weight 83 is longitudinally apertured to receive the part 82 and anti-friction rollers 84 are mounted in recesses 85 formed in the weight adjacent the aperture. Provision is preferably made for sliding the weight 83 outwardly upon the part 82 when the arm 19 is rotated to cause the prong 29 to engage the bundle and for sliding the weight 83 inwardly upon the part 82 when the arm 19 is reversely rotated to cause the prong 29 to release the bundle. As shown, a bracket plate 86 is fixedly mounted upon the head 17 and extends rearwardly therefrom alongside of the weight 83. A U-shaped lever 87 is pivotally mounted at 88 upon the rear end of the bracket 86 and one arm of the lever 87 is connected by a link 89 to the weight 83, and the other arm of the lever 87 is slotted, as indicated at 90, to slidingly receive a stud 91 mounted upon the higher end of the rod 63. By this means vertical reciprocation of the rod 63 which rotates the arm 19 also slides the weight 83 back and forth upon the part 82.

I claim as my invention—

1. In a bundle transfer for grain binders in combination, a pair of substantialy parallel arms of unequal length mounted to swing about an axis perpendicular to their length, the longer arm being rotatable, a fork mounted on the end of the shorter arm, said fork being rotatable about an axis parallel to the axis about which the arms swing, a finger projecting at a right angle from the end of the longer arm, said finger being movable by the turning of the arm on which it is mounted to a position in front of the fork parallel to the axis about which the fork turns, and means for turning the fork during the swinging of the arms.

2. A bundle reversing mechanism for grain binders and the like, comprising, in combination, a rotatable abutment bodily movable through a quadrant about an axis parallel to the axis of rotation of the abutment, a prong movable to a position wherein it is parallel to the axis of rotation of the abutment and thereafter movable with the abutment but upon a different radius, and means for rotating the abutment during the said movement.

3. A bundle turning mechanism for grain binders and the like, comprising, in combination, a fork rotatable through a quadrant, and a prong movable to a position in front of the fork and parallel to the axis about which the fork rotates.

4. A bundle reversing mechanism for grain binders and the like comprising, in combination, a fork rotatable through a quadrant and bodily movable through a quadrant about an axis parallel to the axis about which the fork rotates and a prong movable with relation to the fork to a position in front of the fork and parallel with the said axis about which the fork rotates and movable with the fork through the said quadrant but on a different radius.

5. In a bundle transfer for grain binders and the like, in combination, a pair of arms transversely mounted upon a support, bundle grasping means carried by the said arms at one side of the support, a counterweight movably mounted upon one of the arms at the other side of the support and means for simultaneously operating the said bundle grasping means and shifting the counterweight.

6. In a bundle transfer for grain binders and the like, in combination, a movable conveyer arm supported intermediate its ends, bundle grasping means and a counterweight carried by the arm at opposite sides of its said point of support, the counterweight being movable upon the arm toward and away from the said point of support, and means for closing the bundle grasping means and moving the counterweight outwardly at one position of the conveyer arm and for opening the bundle grasping means and moving the counterweight inwardly at a different position of the conveyer arm.

LOUIS ANDERSON.

Witnesses:

CHARLES B. GILLSON,
E. M. KLATCHER.

Copies of this patent may be obtained for five cents each, by addressing the "Commissioner of Patents, Washington, D. C."